United States Patent
Conrad et al.

[19]

[11] Patent Number: 6,156,102
[45] Date of Patent: Dec. 5, 2000

[54] METHOD AND APPARATUS FOR RECOVERING WATER FROM AIR

[75] Inventors: Wayne Ernest Conrad; Helmut Gerhard Conrad, both of Hampton, Canada

[73] Assignee: Fantom Technologies Inc., Welland, Canada

[21] Appl. No.: 09/188,349

[22] Filed: Nov. 10, 1998

[51] Int. Cl.[7] .............................. B01F 3/04; B01D 15/00; B01D 17/09; B01D 47/06

[52] U.S. Cl. ................................. 95/172; 95/173; 95/174; 95/178; 95/179; 95/186; 95/188; 95/193; 95/206; 95/209; 95/211; 95/219; 95/227; 95/228; 95/229; 95/231; 96/188; 96/242; 96/265; 96/266; 96/295; 96/314

[58] Field of Search ................................ 95/91, 172, 173, 95/174, 178, 180, 179, 177, 211, 219, 220, 227, 228, 229, 231, 186, 187, 188, 193, 206, 209, 247, 250, 251; 96/265, 266, 295, 297, 244, 314, 188, 242, 218

[56] References Cited

U.S. PATENT DOCUMENTS

| | | | |
|---|---|---|---|
| 3,343,346 | 9/1967 | Broyard | 96/314 |
| 3,385,575 | 5/1968 | Hall | 261/112.1 |
| 3,777,456 | 12/1973 | Lund | 95/231 |
| 4,178,158 | 12/1979 | Yoshida et al. | 96/242 |
| 4,189,848 | 2/1980 | Ko et al. | 34/32 |
| 4,290,208 | 9/1981 | Hellman | 34/9 |
| 4,434,034 | 2/1984 | Padilla | 202/153 |
| 4,726,817 | 2/1988 | Roger | 55/33 |
| 4,756,726 | 7/1988 | Peace | 55/275 |
| 4,979,965 | 12/1990 | Sannholm | 95/231 |
| 5,048,200 | 9/1991 | Ryham | 34/32 |
| 5,233,843 | 8/1993 | Clarke | 62/271 |
| 5,441,605 | 8/1995 | Beasley et al. | 202/176 |
| 5,471,852 | 12/1995 | Meckler | 62/271 |
| 5,490,873 | 2/1996 | Behrens et al. | 95/160 |
| 5,566,468 | 10/1996 | Graeff | 34/80 |
| 5,575,832 | 11/1996 | Boyd | 95/91 |
| 5,632,802 | 5/1997 | Grgich et al. | 95/10 |
| 5,643,421 | 7/1997 | Smith | 203/12 |
| 5,766,313 | 6/1998 | Heath | 95/161 |

FOREIGN PATENT DOCUMENTS

| | | |
|---|---|---|
| 2070098 | 11/1993 | Canada . |
| 2551670 | 3/1985 | France . |
| 2252738 | 2/1991 | United Kingdom . |

*Primary Examiner*—Duane Smith
*Assistant Examiner*—Robert A. Hopkins
*Attorney, Agent, or Firm*—Philip C. Mendes da Costa; Bereskin & Parr

[57] ABSTRACT

A process of separating water from ambient air involves a liquid desiccant to first withdraw water from air and treatment of the liquid desiccant to produce water and regenerated desiccant. Water lean air is released to the atmosphere. Heat generated in the process is recycled. The drying capacity, or volume of water produced, of the system for a given energy input is favored over the production of dried air.

42 Claims, 4 Drawing Sheets

METHOD AND APPARATUS FOR RECOVERING WATER FROM AIR

FIELD OF THE INVENTION

This invention relates to a method and apparatus for producing water and, and more particularly, to the use of a desiccant to extract water from air and the recovery of the extracted water from the desiccant in an energy-efficient manner. The water may to treated to obtain potable water.

BACKGROUND OF THE INVENTION

In many locations there is a shortage of water such as in arid regions of the planet. In other locations there is a shortage of potable water such as in areas which have poor water treatment or areas which have experienced a natural disaster (eg. a flood) or a man made disaster (eg. a war). In many cases, however, the ambient air contains sufficient moisture that, if extracted, could provide a supply of water to these regions.

One method for extracting water from air is to compress the air to the point where water vapour condenses to form liquid water. This method requires large amounts of energy and equipment involving many moving parts including seals which must withstand high pressures. The cost and complexity of this method makes it undesirable.

Another method is disclosed in U.S. Pat. No. 4,726,817. Pursuant to this disclosure, the ambient air is canalized and cooled in a free space. The cooled air is then passed through a curtain of hygroscopic fibres where water vapour condenses into liquid water which is evacuated through a conduit. To date, no device to obtain water in useable form from the atmosphere has achieved commercial acceptance In industry, it is sometimes necessary to remove water from air and different methods have been developed to achieve this result. For example, water may be removed from air by passing the air over a cool surface to condense out water. This technique is used in various areas of art such as to separate water from process flow streams in industry or to provide drier chilled air for climate control. U.S. Pat. No. 4,726,817 also used the concept of cooling the air to condense water vapour.

Industry has also used liquid desiccants for extracting water from air. For example, U.S. Pat. No. 4,189,848 discloses a process in which a liquid desiccant is used to dehumidify air for the purpose of drying a crop. In a closed loop portion of the process, air for drying, on leaving a drying bin, is contacted with a liquid desiccant to remove moisture from it, heated, and recirculated to the drying bin. The liquid desiccant is re-concentrated after contact with the air so that it may be re-used.

The effectiveness of liquid desiccants can be expressed in terms of their "drying efficiency" and "drying capacity". "Drying efficiency" is the ratio of total water exposed to the hygroscopic solution to the amount of water removed. "Drying capacity" is the quantity of water that a unit mass of desiccant can extract from the air.

The drying efficiency and drying capacity of a hygroscopic solution is in part dependant on the partial pressure of water vapour in the air and on the concentration of the solute, which effects the partial pressure of water vapour in the desiccant. Although other factors influence the reaction, a hygroscopic solution having a high concentration of solute, and thus a low partial pressure of water vapour, quickly adsorbs water from air having a higher partial pressure of water vapour and so its initial drying efficiency is high. As water is adsorbed in the hygroscopic solution, the partial pressure of water vapour in the solution increases and the rate of water adsorption slows down. Eventually, the hygroscopic solution and the air reach equilibrium and no more water will be adsorbed. In a regenerative process, the extracted water must therefore be separated from the hygroscopic solution to return it to its initial concentration. This regeneration step accounts for a significant amount of the energy required in a regenerative process.

The focus of the process disclosed in U.S. Pat. No. 4,189,848 is on reducing the amount of water in the relatively fixed volume of air that is recirculated to the drying bin. As the air is recirculated, increased amounts or water are removed from the air until the air reaches the required level of dryness. Any water extracted from the air is an unwanted by-product. Therefore, in designing the drying cycle to reach the required level of dryness, the drying efficiency of the liquid desiccant is a primary design criteria and the process is designed to favour the drying efficiency, and not the drying capacity, or the liquid desiccant.

SUMMARY OF THE INVENTION

The present invention discloses a novel use for desiccants, namely the use of desiccants to obtain water from air. While liquid desiccants are known, they have been used to dry a defined amount of air or product (eg crops in a bin) and processes have been designed to achieve this result. The present invention is a paradigm shift in thinking which views the water itself as the valuable end product and provides a regenerative process for separating water from air using a desiccant which, over the full cycle of the process, favours the drying capacity of a desiccant over the drying efficiency of the desiccant.

The present invention efficiently uses the drying capacity of a hygroscopic solution in a regenerative process to produce water. The external energy required to treat the water rich hygroscopic solution to remove water from is reduced by recycling energy within the process to regenerate the hydroscopic solution.

In accordance with the present invention, there is provided a regenerative process for separating water from air comprising:

(a) providing a hygroscopic solution comprising an solute in an initial concentration;

(b) contacting the hygroscopic solution with air containing water to obtain a water rich hygroscopic solution having a concentration of solute less than the initial concentration and a water lean air stream;

(c) separating the water lean air stream from the water rich hygroscopic solution;

(d) releasing the water lean air stream to the atmosphere; and, (e) treating the water rich hygroscopic solution to obtain water and the hygroscopic solution.

In accordance with the present invention, there is also provided a regenerative process for separating water from air comprising:

(a) providing a releasable water absorption means;

(b) contacting the releasable water absorption means with air containing water vapour in a contact area to obtain a water rich releasable water absorption means and a water lean air stream;

(c) separating the water lean air stream from the water rich releasable water absorption means;

(d) releasing at least a portion of the water lean air stream to the atmosphere; and, (e) removing water from the water rich releasable water absorption means to regenerate the releasable water absorption means and collecting the water for use.

In accordance with the present invention, there is also provided an open loop regenerative process for separating water from air comprising:

(a) contacting a desiccant with air containing water and maintaining a difference in the partial pressure of water in the desiccant compared to the partial pressure of water in the air to preferentially favour the drying capacity of the desiccant over the drying efficiency of the desiccant to obtain a water rich desiccant and a water lean air stream;

(b) separating the water lean air stream from the water rich desiccant; and, (c) removing water from the water rich desiccant to regenerate the desiccant and collecting the water.

In one embodiment, the hygroscopic solution is treated to produce discrete droplets prior to contacting the hygroscopic solution with air containing water to obtain the water rich hygroscopic solution. Preferably, the air is induced to flow in a cyclonic path to separate the water lean air stream from the droplets of the water rich hygroscopic solution. The hygroscopic solution May be contacted with the air in a plurality of stages which are operated counter current.

In another embodiment, the hygroscopic solution is contacted with air by flowing the hygroscopic solution in sheet flow over a plate while flowing air across the plate. Alternately, the hygroscopic solution may be contacted with the air in a packed column.

In one embodiment, the water rich hygroscopic solution is treated to obtain water and the hygroscopic solution by contacting the water rich hygroscopic solution against a feed side of a membrane, collecting water from a permeate side of the membrane and withdrawing a retentate of the first hygroscopic solution from the feed side of the membrane.

In another embodiment, water in the water rich hygroscopic solution is vaporized to obtain water vapour and the hygroscopic solution and the water vapour is subsequently condensed. The water rich hygroscopic solution may be heated by an external heat source. Alternately, or in addition, the water rich hygroscopic solution may be heated at least in part by the heat of condensation which is liberated by the condensation of the water vapour. Alternatively, or in addition, the water rich hygroscopic solution may be subjected to sub-atmospheric pressure to assist in volatilizing water therefrom.

In another embodiment, the water rich hygroscopic solution may be treated to obtain water and the hygroscopic solution by:

(a) subjecting the water rich hygroscopic solution to at least one heat exchange step to indirectly heat the water rich hygroscopic solution to an elevated temperature at a first pressure;

(b) introducing the heated water rich hygroscopic solution into an area at a second pressure below the first pressure whereupon water in the water rich hydroscopic solution is evolved to produce a heated hygroscopic solution and heated water; and, (c) using the heated water to heat the water rich hygroscopic solution.

Pursuant to this embodiment, the heated hygroscopic solution may be used to indirectly heat the water rich hygroscopic solution and produce a cooled hygroscopic solution. The cooled hygroscopic solution may be further cooled prior to contacting the hygroscopic solution with air.

A motor driven fan may be used to draw air to contact the hygroscopic solution and the water rich hygroscopic solution may be heated by using the water rich hygroscopic solution to cool the motor.

In another embodiment, the water rich hygroscopic solution may be treated to obtain water and the hygroscopic solution by:

(a) dividing the water rich hygroscopic solution into a first stream, a plurality of intermediate streams and a final stream;

(b) heating the first stream to evolve a portion of the water in the first stream and condensing water evolved from the first stream to obtain water, a first heated hygroscopic solution and liberated heat of condensation;

(c) subjecting a first one of said plurality of intermediate streams to a reduced pressure and using the liberated heat of condensation from step (b) to heat the first intermediate stream to evolve a portion of the water in the first intermediate stream and condensing water evolved from the first intermediate stream to obtain water, a second heated hygroscopic solution and liberated heat of condensation and sequentially repeating step (c) for each intermediate stream; and, (d) using the liberated heat of condensation from the last heated intermediate stream of step (c) and the heated hygroscopic solutions to heat the final stream to obtain water, a final heated hygroscopic solution and liberated heat of condensation and using this liberated heat of condensation to heat the first stream in step (b).

Pursuant to this embodiment, the final heated hygroscopic solution may be used to heat the final stream. The heated hygroscopic solutions may be combined and cooled prior to contacting the combined hygroscopic solution with air.

In one embodiment, the hygroscopic solution is contacted with the air until the concentration of the solute in the water rich hygroscopic solution is reduced to a preset level and the water rich hygroscopic solution is then treated to obtain water and the hygroscopic solution.

Preferably, the solute is selected from the group consisting of inorganic salts, such as Group 1 chloride and a Group 2 chloride, or organic compounds such as glycol, glycerine and sulphuric acid. More preferably, the solute is lithium chloride and/or calcium chloride.

In a preferred embodiment, the water is collected and treated to obtain potable water.

BRIEF DESCRIPTION OF THE DRAWINGS

These and other advantages of the instant invention will be more fully and particularly described in combination with the following descriptions of the drawings in which.

DETAILED DESCRIPTION OF THE INVENTION

The regenative process may be conducted either on a continuous basis or on a batch basis. The process uses a regenerable media for absorbing and releasing water (i.e. a releasable water absorption means). Any such media known in the art may be used. The media may be a hygroscopic solution and, preferably, an aqueous solution of a hygroscopic solute. In a particularly preferred embodiment, the hygroscopic solution is a liquid desiccant such as a solution of a Group 1 and/or a Group 2 salt (preferably a chloride) in water, glycol, glycerine or sulphuric acid. Most preferably, the liquid desiccant is an aqueous solution of lithium chloride and/or calcium chloride. However, if flowable, a solid desiccant may be used.

If the hygroscopic solution is an aqueous solution of a chloride, eg. lithium chloride, then the solute may compris about 40 weight percent lithium chloride based on the total weight of the solution.

Figure 1:
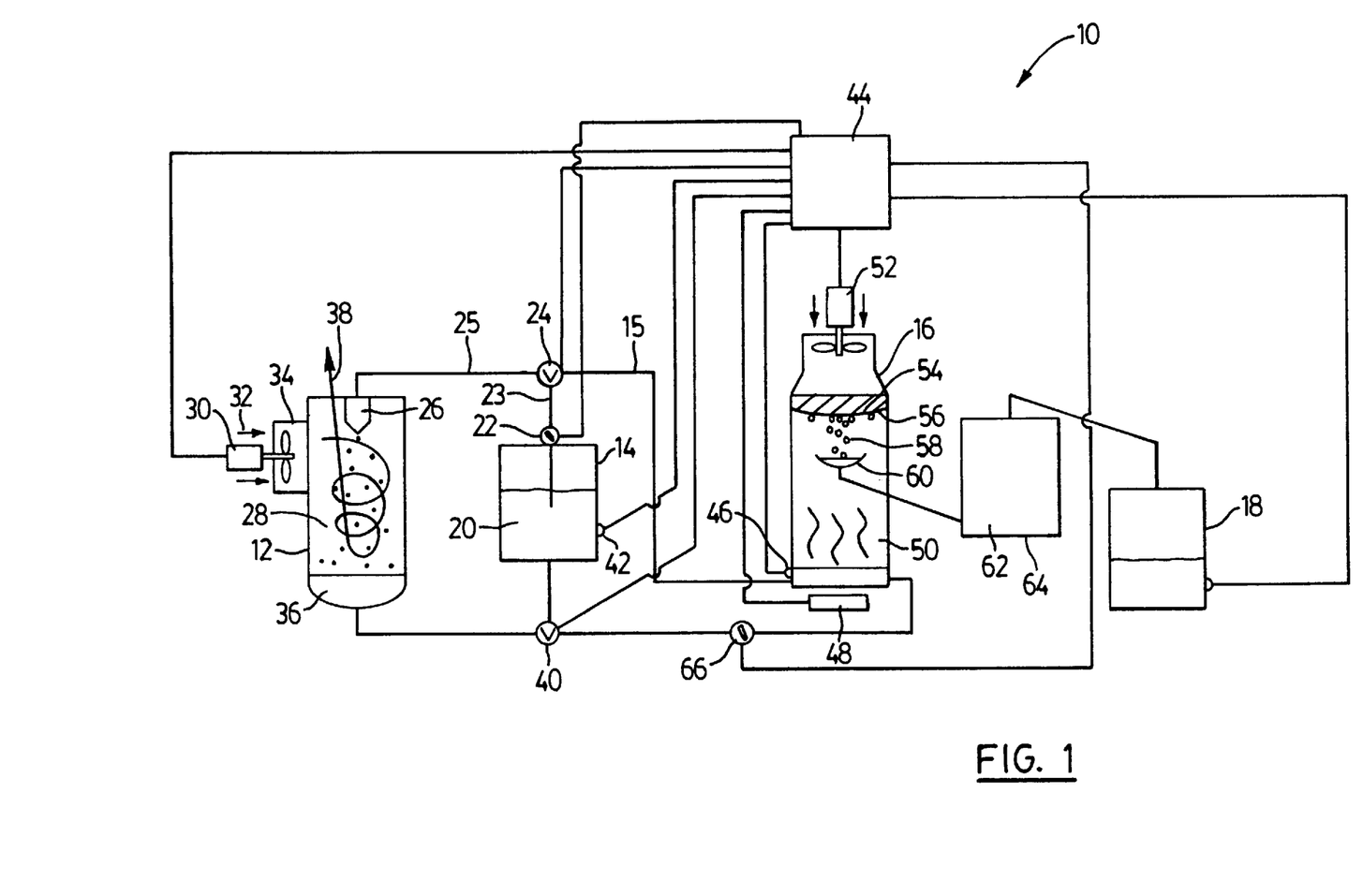
FIG. 1 is a schematic drawing of one embodiment of the present invention.

Referring to FIG. 1, a schematic drawing of a reactor 10 is shown for removing water from air in a batch process. Reactor 10 has a water absorption chamber 12, a desiccant reservoir 14, a water collection chamber 16, and a water reservoir 18. A hygroscopic solution 20 is stored in the desiccant reservoir 14.

Water absorption chamber 12 defines a contact area in which air is contacted with hygroscopic solution 20. The air and hygroscopic solution 20 are introduced into water absorption chamber 12 so that the water and hygroscopic solution 20 will contact each other and thereby water will be transferred to hygroscopic solution 20. Any technique known in industry may be used. The greater the contact time and the greater the surface area of hygroscopic solution exposed to the air, the greater the amount of water that will be absorbed into hygroscopic solution 20. The two streams may be individually introduced into the contact area but, preferably, the are introduced simultaneously so as to mix together. Various contact techniques may be used such as atomizing the hygroscopic solution, using plate contacting techniques or the use of a packed tower.

As shown in FIG. 1, a pump 22 forces the hygroscopic solution 20 from the desiccant reservoir 14 via stream 23 through a valve 24 and via stream 25 to a nozzle 26 in the water adsorption chamber 12. The force of the pump 22, in combination with the restriction of the nozzle 26, pressurizes the hygroscopic solution 20 so that it leaves the nozzle 26 in fine, discrete droplets 28 and preferably as a mist. The nozzle breaks up the water to produce a media having a very high surface area so as to increase the surface area available for adsorbing water from the air in water absorption chamber 12.

As the droplets 28 are sprayed into the water adsorption chamber 12, a fan 30 forces ambient air 32 into the water adsorption chamber 12. Ambient air 32 is preferably introduced into water absorption chamber 12 so as to flow in a cyclonic path first downwardly adjacent the inner side wall of chamber 12 and then upwardly through the centre portion of chamber 12. For example, a shroud 34 around the fan 30 and/or the shape of the water adsorption chamber 12 may cause ambient air 32 to enter chamber 12 tangentially to flow in a cyclonic path in the water adsorption chamber 12 before flowing out of the top of the water adsorption chamber 12. The cyclonic airflow of the ambient air 32 in the water adsorption chamber 12 encourages contact between the ambient air 32 and the droplets 28 of hygroscopic solution 20 but does not substantially entrain the droplets 28 in the air when it exits chamber 12. The droplets 28 of hygroscopic solution 20 contact the ambient air 32 and adsorb water contained in the ambient air 32. The hygroscopic solution 20 thus becomes a water rich hygroscopic solution 36 which may pool at the bottom of the water adsorption chamber 12.

Simultaneously, the ambient air 32 is depleted of moisture and exits the water adsorption chamber as a water lean air stream 38.

Although the affinity of the hygroscopic solution for absorbing water is dependant on many factors, one significant factor is the partial pressures of water vapour in the air and in the hygroscopic solution. When the ambient air has a higher water vapour partial pressure then the hygroscopic solution, water passes from the air to the hygroscopic solution. This process stops when the partial pressures of water vapour in the hygroscopic solution and in the air are equalized. Conversely, the rate of transfer is greater when the difference in partial pressures of water vapour in the air and in the hygroscopic solution are greater.

As there is effectively an unlimited supply of ambient air 32, the water content of hygroscopic solution 20 is favoured, and is preferably maximized, over the need to minimize the moisture content of water lean air stream 38. Therefore, it is preferable if a significant proportion of the drying capacity of the desiccant is used. Since the supply of air is essentially limitless and producing dehumidified air is not an object of the invention, the drying efficiency, which is the fraction of total water input that the desiccant removes, is of little importance. Accordingly, it is preferable in the present embodiment to maintain a high difference in the water vapour partial pressure between the air 32 and the hygroscopic solution 20.

By not drying air 32 too much (eg. by maintaining a brisk flow of air through the reactor), the partial pressure of water vapour that contacts the hygroscopic solution is maintained at a high level. Thus, drying of the air in contact with the desiccant is minimized and the partial pressure of water vapour in the air remains high allowing the desiccant to adsorb water even after it is partially diluted by absorbed water. Generally, if more water can be adsorbed by a given volume of desiccant, the energy required to treat the desiccant, for a given volume of water extracted, is reduced. It is preferable therefore to keep the partial pressure of the ambient air 32 at a high level by maintaining a high degree of flow of ambient air 32 through the water adsorption chamber 12 and by releasing the water lean air stream 38 to the atmosphere. While a portion of stream 38 may be recycled through the process, preferably there is no recycle so that the air flow loop is fully open.

The water rich hygroscopic solution 36 that collects on the bottom of the water adsorption chamber 12 is conveyed back to the desiccant reservoir 14 through a return valve 40. The water rich hygroscopic solution 36 mixes with hygroscopic solution 20 in the desiccant reservoir 14 and is recirculated by pump 22 to the water adsorption chamber 12 for further contact with ambient air 32. Through recirculation and repeated contact with the ambient air 32, more of the drying capacity of the hygroscopic solution 20 may be used. Although the drying efficiency of the hygroscopic solution is lowered with each recirculation, since the supply of ambient air 32 is continually refreshed, the hygroscopic solution 20 continues to be effective in withdrawing water from the air. In the case of a lithium chloride solution, the hygroscopic solution is recirculated until the concentration of lithium chloride is reduced to from about, eg., 40 weight percent solute, based on the total weight of the solution,to about, eg., 20 to about 30 weight percent solute.

When a concentration sensor 42 determines that the solution in the desiccant reservoir 14 is at a concentration of, eg. 20 to 30 weight percent solute, the liquid in the desiccant reservoir 14 is considered to be comprised of water rich hygroscopic solution 36. At this point, a controller 44 connected to the concentration sensor 42 may shut down the fan 30. Controller 44 changes the position of valve 24 and causes the pump 22 to move the water rich hygroscopic solution 36 via stream 15 into the water collection chamber 16.

Water collection chamber 16 functions to concentrate water rich hygroscopic solution 36. Various concentration means may be utilized either alone or in combination including heating solution 36 to evolve water (which is subsequently collected), subjecting the solution to a reduced pressure (eg. flashing solution 36) and reverse osmosis. It will be appreciated that any portion of water rich hygroscopic solution 36 may be transferred to and treated in chamber 16 and that water rich hygroscopic solution 36 may be treated to obtain any desired concentration of solute in the resultant concentrated product.

Preferably all or substantially all of the water rich hygroscopic solution 36 is transferred to the water collection chamber 16, as determined by volume sensor 46. At this point, the controller 44 turns the pump 22 off and then turns on a heater 48 which heats the water rich hygroscopic solution 36 causing it to evolve water vapour. Water in the form of water vapour 50 leaves the water rich hygroscopic solution 36 and rises to upper surface 56 of the water collection chamber 16. Upper surface 56 is preferably convex in shape and may be cooled eg, by refrigeration or a chilled fluid. Preferably, a cooling fan 52 blows air through a heat exchanger 54 which in turn cools the upper surface 56 of the water collection chamber 16. Water vapour 50 which contacts the upper surface 56 of the water collection chamber 16 condenses to form water droplets 58 which flow toward the centre of the upper surface 56. The water droplets 58 then fall into a water collector 60 which collects water 62 which flows, eg. by gravity, to water reservoir 18.

Preferably, the water is for domestic use, eg. as potable water. Accordingly, water 62 may be passed to a purifier 64 which may be an ozone water purification unit. Water 62 when purified may then be collected in the water reservoir 18.

Heater 48 may be any device for heating water rich hygroscopic solution 36. Heater 48 may be a burner which burns a fossil fuel. Alternately, if electricity is available, it may be an electric heater. A further alternate embodiment utilizes solar power to heat water rich hygroscopic solution 36.

The volume sensor 46 preferably is a combined sensor which can also measure the concentration of lithium chloride. As water is removed from the water rich hygroscopic solution 36 in the water collection chamber 16, the hygroscopic solution is concentrated and preferably, the process is conducted until the hygroscopic solution is concentrated to its original concentration (i.e. to hygroscopic solution 20). When the volume sensor 46 determines that the desired concentration has been achieved, the controller 44 preferably turns off the cooling fan 52 and the heater 48. The controller 44 then turns on return pump 66 and operates return valve 40 to allow the hygroscopic solution 20 to return to the desiccant reservoir 14. When concentration sensor 42, which preferably also contains a sensor for measuring volume, and/or volume sensor 46 indicate that all the hygroscopic solution 20 has been returned to the desiccant reservoir 14, the controller operates valve 24 and pump 22 to deliver hygroscopic solution 20 to the water adsorption chamber 12 while fan 30 may be turned on such that the process is repeated.

Figure 2:
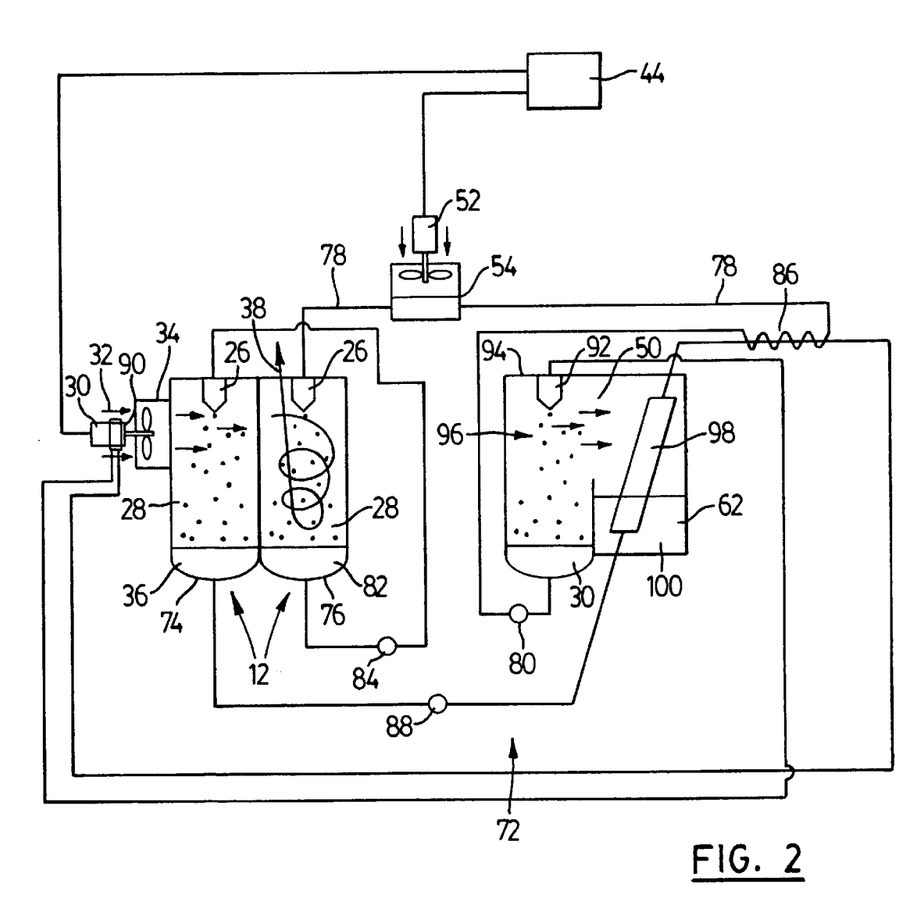
FIG. 2 is a schematic drawing of another embodiment of the present invention.

It will be appreciated that a plurality of water collection chambers 16 may be used, such as in counter current flow (as is discussed with respect to FIG. 2). Further, a plurality of water collection chambers 16 may be employed either in parallel or in series. In one embodiment, the process may be conducted on a continuous or a partially continuous basis wherein a portion of the hygroscopic solution is treated to remove water while another portion is being contacted with the air to absorb water. Further, the reconcentrated hygroscopic solution may be cooled prior to the process being recommenced.

Referring to FIG. 2, an alternate reactor 72, which demonstrates a continuous process, is shown. In the alternate reactor 72, the water adsorption chamber 12 comprises two chambers which operate in counter flow, namely a first water adsorption chamber 74 and a second water adsorption chamber 76. In this embodiment, the hygroscopic solution is atomized to increase the contact area with ambient air 32, although any contact method discussed with respect to FIG. 1 may be utilized.

A fan 30 controlled by a controller 44 is used to introduce ambient air 32 into the first water adsorption chamber 74. Once again, ambient air 32 preferably travels in a cyclonic flow pattern through the first water adsorption chamber 74. Ambient air 32 may exit from the top of the first water adsorption chamber 74 as discussed with respect to FIG. 1. Alternately, as shown in FIG. 2, ambient air may be fed directly into the second water adsorption chamber 76 where it preferably also flows in a cyclonic pattern. The ambient air 32 exits the water adsorption chamber 12 through the top of the second water adsorption chamber 76 as water lean air stream 38, water having been adsorbed by droplets 28 of hygroscopic solution 20 in the water adsorption chambers 74 and 76.

Hygroscopic solution 20 is delivered under pressure to water adsorption chamber 12 through supply pipe 78 by supply pump 80. The hygroscopic solution 20 is atomized by nozzle 26 in the second water adsorption chamber to create droplets 28 which contact the ambient air 32. The droplets 28 collect at the bottom of the second water adsorption chamber 76, having adsorbed some water to become an intermediate hygroscopic solution 82. Recirculation pump 84 pumps the intermediate hygroscopic solution 82 to nozzle 26 in the first water adsorption chamber 74. The intermediate hygroscopic solution 82 is atomized into droplets 28 which collect at the bottom of the first water adsorption chamber as a water rich hygroscopic solution 36.

Preferably, the counter-current contact of hygroscopic solution 20 results in a water rich hygroscopic solution 36 of, eg., 30%–40% lithium chloride. This can be achieved by atomizing the hygroscopic solution 20 into very fine droplets 28 which provide an extremely large surface area for contact of the hygroscopic solution 20 with ambient air 32. The cyclonic air-flow of ambient air 32 in the water adsorption chamber 12 serves to separate the droplets 28 from the ambient air 32 despite their small size.

Through the use of a water adsorption chamber 12 having two separate chambers, hygroscopic solution 20 contacts the ambient air 32 twice to allow a greater proportion of its drying capacity to be used. As in the embodiment of FIG. 1, the drying efficiency is of lesser importance and the flow rate of ambient air is again preferably maintained at a high rate so that the partial pressure of water in the ambient air 32 remains high in both stages of contact. The two stages of contact are operated counter-current as described so that the difference in partial pressures of water vapour between the ambient air 32 and the hygroscopic solution is maintained at a higher level Although the ambient air 32 loses some of its moisture in the first water adsorption chamber 74, and thus has a decreased partial pressure of water vapour in chamber 76, the partial pressure of water vapour in the hygroscopic solution 20 which enters the second water adsorption chamber 76 is also at its lowest level. In the first water adsorption chamber 74 the partial pressure of water vapour of the ambient air 32 is higher as is the partial pressure of water vapour in the intermediate hygroscopic solution. Hence there is a difference in partial pressures of water vapour between the ambient air 32 and the hygroscopic solution 20 or the intermediate hygroscopic solution 82 such that the adsorption of water in both stages is maximized.

In a further alternative, the fan 30 could be used to move air only through the first water adsorption chamber 74 and the air released to the atmosphere through the top of the first water adsorption chamber 74. A second fan could be used to introduce fresh ambient air to the second water adsorption chamber which would similarly exit through the top of the second water adsorption chamber 76 to the atmosphere. In this alternative, a higher difference in partial pressures of water vapour between the air and the hygroscopic solution is maintained in the second water adsorption chamber 76 through the addition of a second fan.

The embodiment shown in FIG. 2 is a continuous process whereby the hygroscopic solution continually recirculates between water adsorption chambers 74 and 76 and the water separation portion of the process. In the water separation portion of the process, the hygroscopic solution is preferably heated which increases the partial pressure of water vapour in the hygroscopic solution and encourages the removal of water from the diluted hygroscopic solution. The elevated temperature of the reconcentrated solution decreases the ability of the hygroscopic solution to adsorb water from the air. Accordingly, it is desirable to cool the hygroscopic solution which is to be contacted with air while heating the hygroscopic solution which is to be reconcentrated and preferably to transfer heat between these two streams of hygroscopic solution.

The water rich hygroscopic solution 36 is preferably heated so as to evolve water therefrom and obtain water and a concentrated hygroscopic solution. The heat liberated by the concentration step is preferably transferred to the water rich hygroscopic solution 36 thus heating the water rich hygroscopic solution 36 and simultaneously cooling the concentrated solution. To this end, the water rich hygroscopic solution 36 may be fed via circulation pump 88 to indirect heat exchanger 98 to first be heated by the heat liberated by the condensation of water in vaporization chamber 94. Subsequently, the water rich hygroscopic solution 36 may be further heated by indirect contact with hygroscopic solution 20 in liquid exchanger 86. Subsequently, the water rich hygroscopic solution 36 may be further heated by cooling fan 30 where it flows in a jacket 90 around the fan 30 and adsorbs heat produced by the fan. The water rich hygroscopic solution 36 may then flows, still under the influence of circulation pump 88, to a pressure nozzle 92 located on a vaporization chamber 94. These heating steps may occur in a different order.

Through these heating steps, the water rich hygroscopic solution 36 reaches vaporization chamber 94 at a temperature sufficiently high so as to cause a portion of the water, and preferably all of the water which was absorbed in chambers 74 and 76, to be vaporized thus reconcentrating the hygroscopic solution to obtain solution 20. Due to heat transfer inefficiencies external heating means, as discussed above with respect to FIG. 1, may optionally be used to supplement the heat transfer at steady state conditions.

The water rich hygroscopic solution 36 reaches the pressure nozzle 92 heated and preferably under pressure so as to form water rich droplets 96 on passage through nozzle 96 as it is released into a vaporization chamber 94. Water vapour 50 spontaneously leaves the water rich droplets 96 (which is encouraged by the increased surface area of the droplets) and condenses on a cool surface. Preferably condensing heat exchanger 98, which preferably has the coolest surface within the vaporization chamber 94, is provided. The water rich hygroscopic solution 36 passes through the condensing heat exchanger 98 and adsorbs heat of condensation liberated by the condensation of the water vapour evolved from solution 36 in vaporization chamber 94.

The concentrated hygroscopic solution 20 collects in the bottom of vaporization chamber 94 and is driven by supply pump 80 through supply pipe 78 to chamber 12. On its passage to chamber 12, the hygroscopic solution 20 is preferably cooled by an indirect liquid heat exchanger 86 (which may be operated counter current). Heat removed from the hygroscopic solution 20 in the liquid exchanger 86 is transferred to the water rich hygroscopic solution 36 which is pushed by circulation pump 88 to the liquid heat exchanger 86. Further, the hygroscopic solution may be further cooled, such as by a heat exchanger 54 which is preferably cools the solution by blowing air over it from a cooling fan 52.

In this way, three sources of heat energy are reclaimed, namely heat produced by fan 30, sensible heat in the hygroscopic solution 20 (via heat exchanger 86), and heat of condensation of water vapour 50 are all recaptured and circulated within the alternate reactor 72.

Water vapour 50 condensing on the condensing heat exchanger 98 collects as water 62 in a temporary reservoir 100 in the vaporization chamber 94 from which it can be withdrawn for use (eg. purification for use as potable water).

As a further alternative to the alternate reactor 72, not illustrated, an additional heater may be used to heat the water rich hygroscopic solution 36 before it reaches the pressure nozzle 92. Preferably, a sensor is used to detect the temperature of the water rich hygroscopic solution 36 before it reaches the pressure nozzle 92 and the controller 44 activates the heater only as necessary to achieve adequate production of water vapour 50 such that the hygroscopic solution 20 is preferably maintained at a concentration of, for example, 40% of lithium chloride on an on-going basis.

As a further alternative embodiment, vaporization of heated water rich hygroscopic solution 36 as described in the alternate reactor 72 could be used in place of the water collection chamber 16 and associated processes in the reactor 10 of FIG. 1.

Figure 3A:
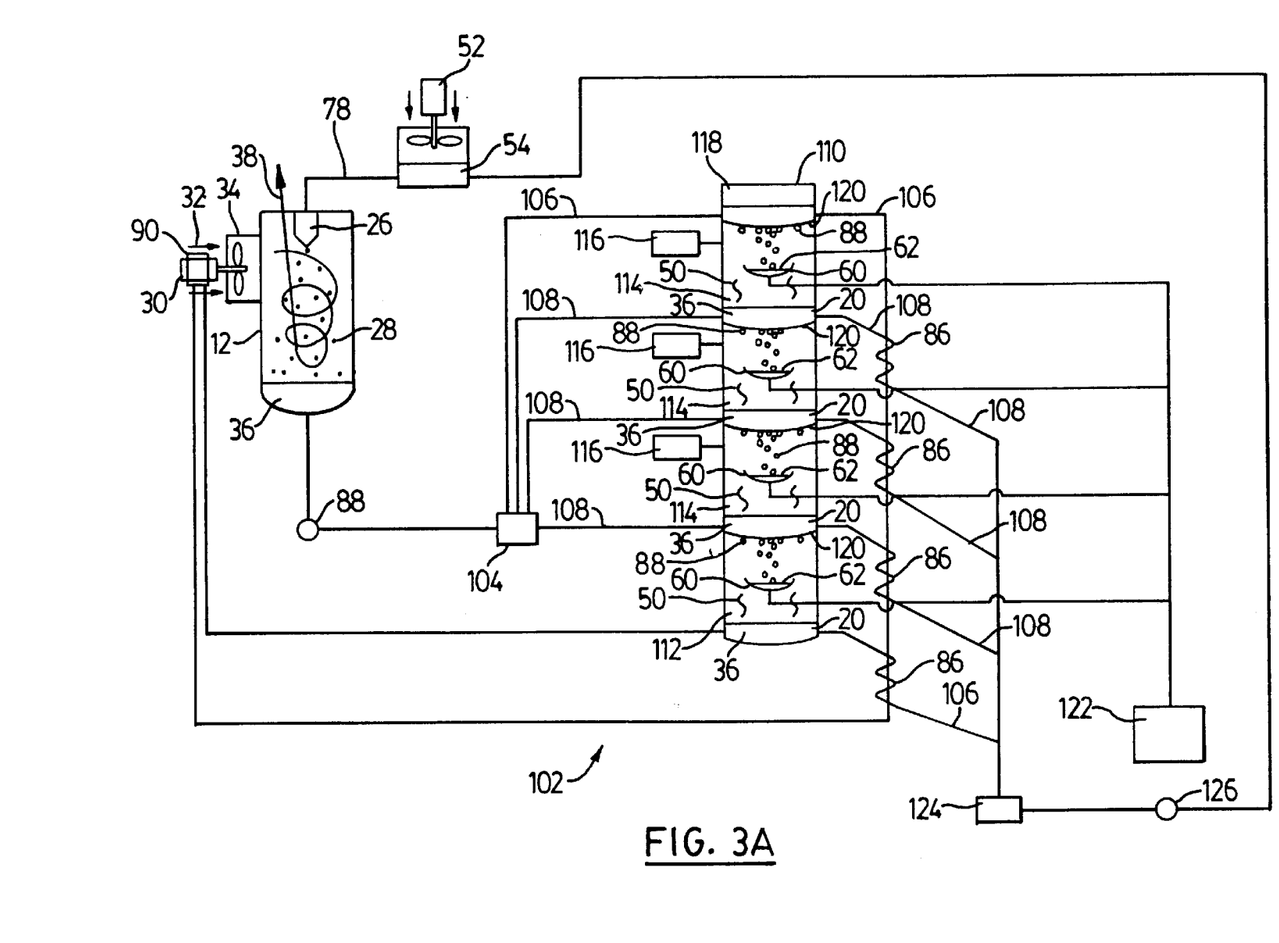
FIG. 3A is a schematic drawing of another embodiment of the present invention; and, FIG. 3B is a schematic drawing of an alternative to the embodiment of FIG. 3A.

Referring to FIG. 3, a second alternate reactor 102 is shown. As in the reactor 10 of FIG. 1, there is a water adsorption chamber 12. A fan 30 causes ambient air 32 to enter the water adsorption chamber 12 where it moves, preferably, in a cyclonic air-flow pattern and exits through the top of the water adsorption chamber 12 as a water lean air stream 38. Simultaneously, hygroscopic solution 20 is sprayed into the water adsorption chamber 12 through a nozzle 26 which causes the hygroscopic solution 20 to be atomized into droplets 28. Droplets 28 adsorb water from the ambient air flowing in the water adsorption chamber 12 then fall to the bottom of the water adsorption chamber 12 as a water rich hygroscopic solution 36. As in the alternate reactor 72 of FIG. 2, this is a continuous process and a cooling fan 52 is preferably used to cool a heat exchanger 54 which cools the hygroscopic solution 20 before it enters a supply pipe 78 leading to the nozzle 26 of the water adsorption chamber 12. Once again, the alternate contact methods discussed above and/or the use of a plurality of contact stages, which may be operated counter current, may be used. Discussion of the present embodiment is primarily intended to illustrate an efficient alternate method for separating water from the water enriched desiccant.

Referring now to FIG. 3, a circulation pump 88 causes the water rich hygroscopic solution 36 to travel from the bottom of the water adsorption 12 to a flow-splitter 104. From the flow-splitter 104, the total flow of water rich hygroscopic solution 36 is divided into two separate flows, a heat collecting flow 106 and a heated flow 108. Preferably the heat collecting flow 106 is approximately 40% of the total flow entering the flow-splitter 104 and the heated flow 108 is further subdivided into 3 separate flows each having 20% of the total flow entering the flow-splitter 104.

All flows pass through an evaporation chamber 110 which includes a first evaporation area 112 at the bottom, three vacuum chambers 114 located sequentially above the first evaporation chamber 112. It will be appreciated that evaporation chamber 110 may have a plurality of chambers and may be of varying configurations. The vacuum chambers 114 are maintained at less than atmospheric pressure by vacuum pumps 116. On top of the upper most vacuum chamber 114 is top chamber 118. The overall structure of the evaporation chamber 110 is such that each of the first evaporation chamber 112, the vacuum chambers 114 and the top chamber 118 are stacked one on top of the other and separated by condensing dishes 120. The conditions inside each of the first evaporation chamber 112 and vacuum chambers 114 are such that water vapour 50 leaves water rich hygroscopic solution 36 which flows into the bottom of each of the first evaporation chamber 112 and the vacuum chambers 114. The water vapour 50 rises to the top of each of the first evaporation chamber 112 and the vacuum chambers 114 and condenses on the condensing surface such as dish 120 positioned adjacent the top of each of these chambers. Water droplets 58 form on the lower surface of the condensing dishes 120, collect at the centre of the condensing dishes 120 and fall to water collectors 60 where a pool of water 62 forms and flows to a storage tank 122. Each condensing dish 120 is warmed by the heat of condensation of the water vapour 50 condensing on it and thus warms the water rich hygroscopic solution 36 flowing in the respective chamber 114 or 118 positioned thereabove.

At steady state conditions, in each chamber 114, the latent heat in the hygroscopic solution, the heat from the vacuum chamber 114 or first evaporation chamber 112 below the chamber 114, in combination with the vacuum produced by the vacuum pumps 116 is sufficient to cause water in the water rich hygroscopic solution 36 to vaporize. Thus water rich hygroscopic solution 36 enters from the left side of each of the vacuum chambers 114 as illustrated and a more concentrated hygroscopic solution 20 exits from the right side of each of the vacuum chambers 114 as illustrated. The hygroscopic solution 20 in the heated flow 108 then flows through indirect liquid heat exchangers 86 to a flow collector 124.

The heat collecting flow 106 is similarly treated in the first evaporation chamber 112 where water vapour 50 leaves the water rich hygroscopic solution 36 entering on the left side of the first evaporation chamber 112 as illustrated and hygroscopic solution 20 leaves from the right side of the first evaporation chamber 112 as illustrated. There is no vacuum in the first evaporation chamber 112 but the heat collecting flow 106 is sufficiently heated by the time that it enters into the left side of the first evaporation chamber 112, as will be describe below, to cause water within it to vaporize. The hygroscopic solution 20 leaving from the right side of the first evaporation chamber also preferably flows through a liquid heat exchanger 86 to the flow collector 124.

Between the flow-splitter 104 and the flow-collector 124, the heat collecting flow 106 is warmed by heat liberated in other parts of the process. The heat collecting flow 106 flows through the top chamber 118 where it is warmed by the heat of condensation of the upper vacuum chamber 114. The heat collecting flow 106 then travels through the liquid heat exchangers 86 collecting heat preferably from all flows leaving the right side of the evaporation chamber 110 while those flows are simultaneously cooled. The heat collecting flow 106 then preferably travels through a jacket 90 on the fan 30 and is warmed by heat produced by the fan 30. In a further embodiment, not illustrated, heat could also be collected from the cooling fan 52. As mentioned above, by the time that the heat collecting flow 106 enters the left side of the first evaporation chamber 112, it is sufficiently heated to cause vaporization of the water within it. Due to heat transfer inefficiencies external heating means, as discussed above with respect to FIG. 1, may optionally be used to supplement the heat transfer at steady state conditions.

Hygroscopic solution 20 which is collected from all sources at the flow collector 124 preferably is concentrated to maintain the concentration of the hyproscopic solution substantially stable throughout the reactor, eg. it may maintain a concentration of 30–40% lithium chloride throughout the system. A return pump 126 pushes the hygroscopic solution 20 from the flow collector 124 to the heat exchanger 54 and the supply pipe 78 to complete the process.

Figure 3B:
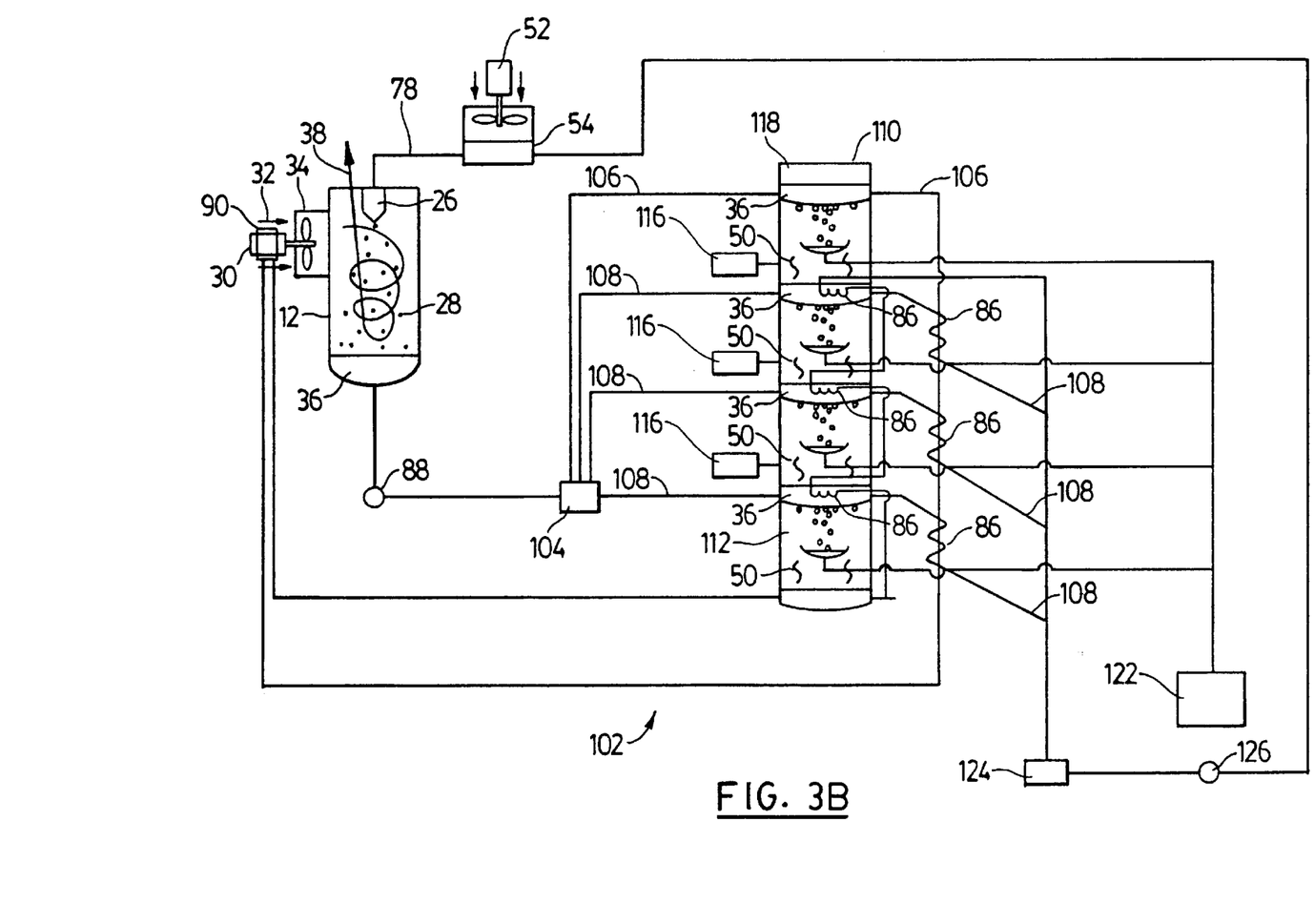

Now referring to FIG. 3B, a further alternate embodiment of the second alternate reactor 102 is shown where modifications have been made to the flow pattern between the flow-splitter 104 and the flow collector 124. As in FIG. 3A, the flow of water rich hygroscopic solution 36 is split in the flow-splitter 104 into a heat collecting flow 106 and a heated flow 108. In FIG. 3B, the flow path of the heated flow 108 is unchanged but the circulation of the heat collecting flow 106 is modified.

As shown in FIG. 3B, the heat collecting flow 106 is warmed by the heat of condensation of the condensing dish 120 that is the bottom of the top chamber 118. As the heat collecting flow 106 leaves the right side of the top chamber 118 it flows through liquid heat exchangers 86 which have been warmed while simultaneously cooling the heated flows 108 leaving the right side of the evaporation chamber 110. In contrast to the embodiment shown in FIG. 3A, however, the heat collecting flow 106 leaving the right side of the evaporation chamber 110 does not flow through a heat exchanger 86. Accordingly, once the heat collecting flow 106 leaves the last heat exchanger 86 warmed by the heated flow 108 it then flows directly to the jacket 90 surrounding the fan 30 where it is warmed by the heat of the fan motor. The heat collecting flow 106 then enters the first evaporation chamber 112 at the left side having been sufficiently warmed to cause vaporization of water contained in the water rich hygroscopic solution 36. The heat collecting flow 106, now consisting of hygroscopic solution 20, leaves the right side of the first evaporation chamber 112 and flows through liquid heat exchangers 86 located in each of the vacuum chambers 114 wherein the heat collecting flow 106 is simultaneously cooled while warming the heated flows 108 in the vacuum chambers 114. The heat collecting flow 106 then returns to the flow collector 124. As a further alternative, the heat collecting flow might also be re-joined with the heated flow at a point between the pump 126 and the heat exchanger 54.

A further alternative embodiment, not illustrated, is to use a reverse osmosis process wherein the water rich hygroscopic solution is contacted, eg., under pressure against the feed side of a solute impermeable membrane. Water is then collected from a permeate side of the membrane while a retentate of re-concentrated hygroscopic solution is withdrawn from the feed side of the membrane.

We claim:

1. A regenerative process for separating water from air comprising:
   (a) providing a hygroscopic solution comprising a solute in an initial concentration;
   (b) contacting the hygroscopic solution with air containing water to obtain a water rich hygroscopic solution having a concentration of solute less than the initial concentration and a water lean air stream;
   (c) separating the water lean air stream from the water rich hygroscopic solution;
   (d) releasing the water lean air stream to the atmosphere; and,
   (e) vapourizing water in the water rich hygroscopic solution to obtain water vapour and the hygroscopic solution and subsequently condensing the water vapour wherein the water rich hygroscopic solution is heated at least in part by the heat of condensation which is liberated by the condensation of the water vapour.

2. The process of claim 1 wherein the hygroscopic solution is treated to produce discrete droplets prior to contacting the hygroscopic solution with air containing water to obtain the water rich hygroscopic solution.

3. The process of claim 2 wherein the air is induced to flow in a cyclonic path to separate the water lean air stream from the droplets of the water rich hygroscopic solution.

4. The process of claim 1 wherein the hygroscopic solution is contacted with the air in a plurality of stages which are operated counter current.

5. The process of claim 1 wherein the hygroscopic solution is contacted with air by flowing the hygroscopic solution in sheet flow over a plate while flowing air across the plate.

6. The process of claim 1 wherein the hygroscopic solution is contacted with air in a packed column.

7. The process of claim 1 wherein the water rich hygroscopic solution is treated to obtain water and the hygroscopic solution by contacting the water rich hygroscopic solution against a feed side of a membrane, collecting water from a permeate side of the membrane and withdrawing a retentate of the first hygroscopic solution from the feed side of the membrane.

8. The process of claim 1 wherein the water rich hygroscopic solution is heated by an external heat source.

9. The process of claim 1 wherein the water rich hygroscopic solution is subjected to sub-atmospheric pressure to assist in volatilizing water therefrom.

10. The process of claim 1 wherein step (e) comprises:
    (a) subjecting the water rich hygroscopic solution to at least one heat exchange step to indirectly heat the water rich hygroscopic solution to an elevated temperature at a first pressure;
    (b) introducing the heated water rich hygroscopic solution into an area at a second pressure below the first pressure whereupon water in the water rich hydroscopic solution is evolved to produce a heated hygroscopic solution and heated water; and,
    (c) using the heated water to heat the water rich hygroscopic solution in step (a) of claim 10.

11. The process of claim 10 further comprising the step of using the heated hygroscopic solution to indirectly heat the water rich hygroscopic solution and produce a cooled hygroscopic solution.

12. The process of claim 11 further comprising the step of cooling the cooled hygroscopic solution prior to contacting the hygroscopic solution with air.

13. The process of claim 12 further comprising the step of using a motor driven fan to draw air to contact the hygroscopic solution in step (b) of claim 1 and heating the water rich hygroscopic solution by using the water rich hygroscopic solution to cool the motor.

14. The process of claim 1 wherein step (e) comprises:
    (a) dividing the water rich hygroscopic solution into a first stream, a plurality of intermediate streams and a final stream;
    (b) heating the first stream to evolve a portion of the water in the first stream and condensing water evolved from the first stream to obtain water, a first heated hygroscopic solution and liberated heat of condensation;
    (c) subjecting a first one of said plurality of intermediate streams to a reduced pressure and using the liberated heat of condensation from step (b) to heat the first intermediate stream to evolve a portion of the water in the first intermediate stream and condensing water evolved from the first intermediate stream to obtain water, a second heated hygroscopic solution and liberated heat of condensation and sequentially repeating step (c) for each intermediate stream; and,
    (d) using the liberated heat of condensation from the last heated intermediate stream of step (c) and the heated hygroscopic solutions to heat the final stream to obtain water, a final heated hygroscopic solution and liberated heat of condensation and using this liberated heat of condensation to heat the first stream in step (b).

15. The process of claim 14 further comprising the step of using the final heated hygroscopic solution to heat the final stream.

16. The process of claim 14 wherein the final heated hygroscopic solution heats the first stream.

17. The process of claim 14 further comprising the step of combining and cooling the heated hygroscopic solutions prior to contacting the combined hygroscopic solution with air.

18. The process of claim 14 further comprising the step of using a motor driven fan to draw air to contact the hygroscopic solution in step (b) of claim 1 and using a stream of the hygroscopic solution to cool the motor.

19. The process of claim 1 wherein the hygroscopic solution is contacted with the air until the concentration of the solute in the water rich hygroscopic solution is reduced to a preset level and the water rich hygroscopic solution is then subjected to step (e).

20. The process of claim 1 wherein the solute comprises lithium chloride.

21. The process of claim 1 further comprising the step of collecting and treating the water obtained in step (e) to obtain potable water.

22. A regenerative process for separating water from air comprising:
    (a) providing a releasable water absorption means;
    (b) contacting the releasable water absorption means with air containing water vapour in a contact area to obtain a water rich releasable water absorption means and a water lean air stream;

(c) separating the water lean air stream from the water rich releasable water absorption means;

(d) releasing at least a portion of the water lean air stream to the atmosphere; and, (e) vaporizing water in the water rich releasable water absorption means to regenerate the releasable water absorption means and to obtain water vapour and condensing the water vapour to obtain water for use wherein the water rich releasable water absorption means is heated at least in part by the heat of condensation which is liberated by the condensation of the water vapour.

23. The process of claim 22 wherein the releasable water absorption means is treated to produce discrete droplets prior to contacting the releasable water absorption means with air containing water to obtain the water rich releasable water absorption means.

24. The process of claim 23 wherein the air is travels in a cyclonic path in the contact area to contact the discrete droplets and to separate the water lean air stream from the droplets of the water rich releasable water absorption means.

25. The process of claim 24 wherein the releasable water absorption means is contacted with the air in a plurality of stages which are operated counter current.

26. The process of claim 22 wherein the releasable water absorption means is contacted with air by flowing the releasable water absorption means in sheet flow over a plate while flowing air across the plate.

27. The process of claim 22 wherein the releasable water absorption means is contacted with air in a column containing material having an extended contact area.

28. The process of claim 22 wherein the water rich releasable water absorption means is subjected to reverse osmosis to obtain water and the releasable water absorption means.

29. The process of claim 22 wherein the water rich releasable water absorption means is heated by an external heating means.

30. The process of claim 22 wherein the water rich releasable water absorption means is subjected to sub-atmospheric pressure to assist in volatilizing water therefrom.

31. The process of claim 22 further comprising the step of collecting and treating the water obtained in step (e) to obtain potable water.

32. An open loop regenerative process for separating water from air comprising:

(a) contacting a desiccant with air containing water to obtain a water rich desiccant and a water lean air stream;

(b) separating the water lean air stream from the water rich desiccant;

(c) dividing the water rich desiccant into a plurality of portions;

(d) subjecting a first portion to conditions at which water is vaporized from the water rich desiccant to produce water vapour and condensing water vapour to produce liquid water;

(e) heating a second portion of the water rich desiccant using at least in part heat of condensation produced from the condensation of water vapour in step (d) to vaporize water from the second portion of the water rich desiccant.

33. The process of claim 32 wherein the desiccant is treated to produce discrete droplets prior to contacting the desiccant with air containing water to obtain the water rich desiccant.

34. The process of claim 33 wherein the air is travels in a cyclonic path in the contact area to contact the discrete droplets and to separate the water lean air stream from the droplets of the water rich desiccant.

35. The process of claim 32 further comprising the step of releasing the water lean air stream to the atmosphere.

36. The process of claim 32 wherein the desiccant is contacted with the air in a plurality of stages which are operated counter current.

37. The process of claim 32 wherein the desiccant is contacted with air by flowing the desiccant in sheet flow over a plate while flowing air across the plate.

38. The process of claim 32 wherein the desiccant is contacted with air in a column containing material having an extended contact area.

39. The process of claim 32 wherein at least one portion of the water rich desiccant is heated by an external heat source.

40. The process of claim 32 wherein the water rich desiccant is subjected to sub-atmospheric pressure to assist in volatilizing water therefrom.

41. The process of claim 32 further comprising the step of collecting and treating the water obtained in step (d) to obtain potable water.

42. The process of claim 32 wherein the second portion is subjected to a lower pressure during step (e) then the first portion is subjected to during step (d).

* * * * *